United States Patent [19]
Asghar

[11] Patent Number: 6,021,133
[45] Date of Patent: Feb. 1, 2000

[54] COMMUNICATION PROCESSING METHOD USING A BUFFER ARRAY AS A VIRTUALLY CIRCULAR BUFFER

[75] Inventor: Saf Asghar, Austin, Tex.

[73] Assignee: Advanced Micro Devices Inc., Sunnyvale, Calif.

[21] Appl. No.: 08/915,556

[22] Filed: Aug. 21, 1997

Related U.S. Application Data

[60] Provisional application No. 60/040,118, Mar. 7, 1997.

[51] Int. Cl.<sup>7</sup> ...................................................... H04L 12/54
[52] U.S. Cl. .......................................... 370/429; 714/701
[58] Field of Search ..................................... 370/389, 392, 370/412, 413, 415, 428, 429; 714/701, 751, 752, 758

[56] References Cited

U.S. PATENT DOCUMENTS

| | | | |
|---|---|---|---|
| 5,083,269 | 1/1992 | Syobatake et al. | 395/425 |
| 5,369,641 | 11/1994 | Dodt et al. | 714/701 |
| 5,502,719 | 3/1996 | Grant et al. | 359/117 |
| 5,875,477 | 2/1999 | Hasbun et al. | 711/162 |
| 5,878,028 | 3/1999 | Roy et al. | 370/235 |

*Primary Examiner*—Ajit Patel
*Attorney, Agent, or Firm*—Foley & Lardner

[57] ABSTRACT

A method of processing incoming ethernet frames includes the steps of storing a header of each incoming ethernet frame in a header column of a buffer array, storing a data field of each incoming ethernet frame in a data column of the buffer array, each data field being stored in a same row of the buffer array as a corresponding header, and storing a CRC of each incoming ethernet frame in a CRC column which is next to the header column, each CRC being stored in a same row of the buffer array as a corresponding header and a corresponding data field. The method can further include the step of evaluating each stored CRC based on the header stored next to the CRC. In one alternative, the header column is between the CRC column and the data column. In another alternative, the CRC column is between the header column and the data column. Also provided is a virtual circular buffer which includes an input frame segmentation unit, a header column connected to the frame segmentation unit, a data field column next to the header column, the data field column being connected to the frame segmentation unit, and a CRC column next to the header column, the CRC column being connected to the frame segmentation unit, wherein the frame segmentation unit receives incoming frames and stores a header of each incoming frame into the header column, a data field of each incoming frame into the data field column next to a corresponding header, and a CRC of each incoming frame into the CRC column next to the corresponding header.

12 Claims, 7 Drawing Sheets

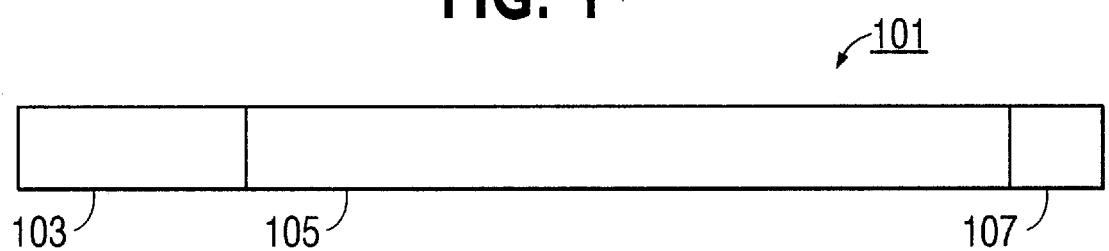
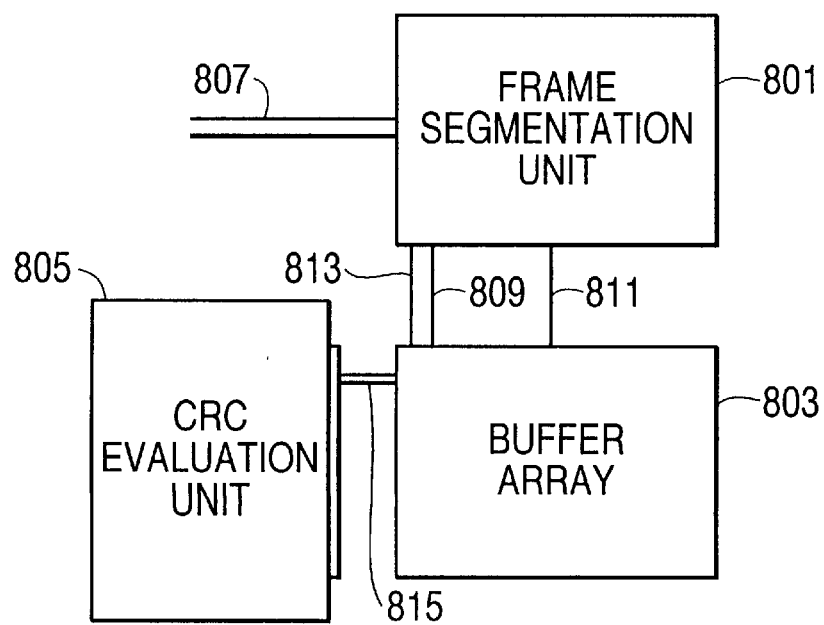

COMMUNICATION PROCESSING METHOD USING A BUFFER ARRAY AS A VIRTUALLY CIRCULAR BUFFER

This application claims benefit of provisional application 60/040,118 filed Mar. 7. 1997.

BACKGROUND OF THE INVENTION

Conventional data communication techniques, such as those employed when communicating in an ethernet environment, can be configured to transmit data frames such as frame 101 shown in FIG. 1. Frame 101 contains header 103, data section 105 and cyclic redundancy check (CRC) section 107. Cyclic redundancy check section 107 is an example of an error detection or correction trailer which is part of frame 101 and is used by a receiving device to determine if frame 101 has been transmitted correctly.

Error detection and correction algorithms are well known. These algorithms conventionally operate on a transmitting frame or packet of information and perform a calculation based on at least a portion of the transmitting frame or packet of information to produce error correction or detection data which is incorporated into the frame or packet during transmission for use by a receiving device to determine whether the frame contains errors (error detection) and correct any errors contained in the frame or packet (error correction). In one example of such a data communication scheme, CRC 107 is based solely on the data contained in header 103. When such a scheme is employed, a receiving device evaluates a received header 103 based upon CRC 107 to determine if the frame or packet is error free. However, since CRC 107 is separated from header 103 by data 105, the processing required to evaluate header 103 based upon CRC 107 is unnecessarily complicated.

It is therefore an object of the present invention to simplify the process of evaluating incoming frames based on a trailing error detection or correction portion, such as a CRC.

SUMMARY OF THE INVENTION

In a first embodiment according to the invention, a method of processing incoming ethernet frames includes the steps of storing a header of each incoming ethernet frame in a header column of a buffer array, storing a data field of each incoming ethernet frame in a data column of the buffer array, each data field being stored in a same row of the buffer array as a corresponding header, and storing a CRC of each incoming ethernet frame in a CRC column which is next to the header column, each CRC being stored in a same row of the buffer array as a corresponding header and a corresponding data field.

This method according to the invention can further include a step of evaluating each stored CRC based on the header stored next to the CRC. The header column can be between the CRC column and the data column. Alternatively, the CRC column can be between the header column and the data column.

In a second embodiment according to the invention, a method of processing incoming frames having a header followed by a data field which is followed by a CRC, includes the steps of storing the header of each incoming frame in a header column of a buffer array, storing a data field of each incoming frame in a data column of the buffer array, each data field being stored in a same row of the buffer array as a corresponding header, and storing a CRC of each incoming frame in a CRC column which is next to the header column, each CRC being stored in a same row of the buffer array as a corresponding header and a corresponding data field.

The method of the second embodiment can further include a step of evaluating each stored CRC based on the header stored next to the CRC. As in the case of the first embodiment according to the invention, in one alternative, the header column can be between the CRC column and the data column, and in another alternative the CRC column can be between the header column and the data column.

In a third embodiment according to the invention, a virtual circular buffer includes an input frame segmentation unit, a header column connected to the frame segmentation unit, a data field column next to the header column, the data field column being connected to the frame segmentation unit, and a CRC column next to the header column, the CRC column being connected to the frame segmentation unit, wherein the frame segmentation unit receives incoming frames and stores a header of each incoming frame into the header column, a data field of each incoming frame into the data field column next to a corresponding header, and a CRC of each incoming frame into the CRC column next to the corresponding header.

The virtual circular buffer of the third embodiment according to the invention can further include a CRC evaluation unit connected to the header column and the CRC column, the CRC evaluation unit evaluating each CRC according to the corresponding header. The header column in the virtual circular buffer, in one alternative, is between the CRC column and the data field column. In another alternative, the CRC column is between the header column and the data field column.

BRIEF DESCRIPTION OF THE DRAWINGS

These and other objects of the invention will be apparent from a review of the detailed description contained herein in light of the drawings, wherein:

FIG. 1 shows a conventional frame or packet;

FIG. 8 shows a block diagram of a virtual circular buffer according to the invention.

DETAILED DESCRIPTION

Figure 2:
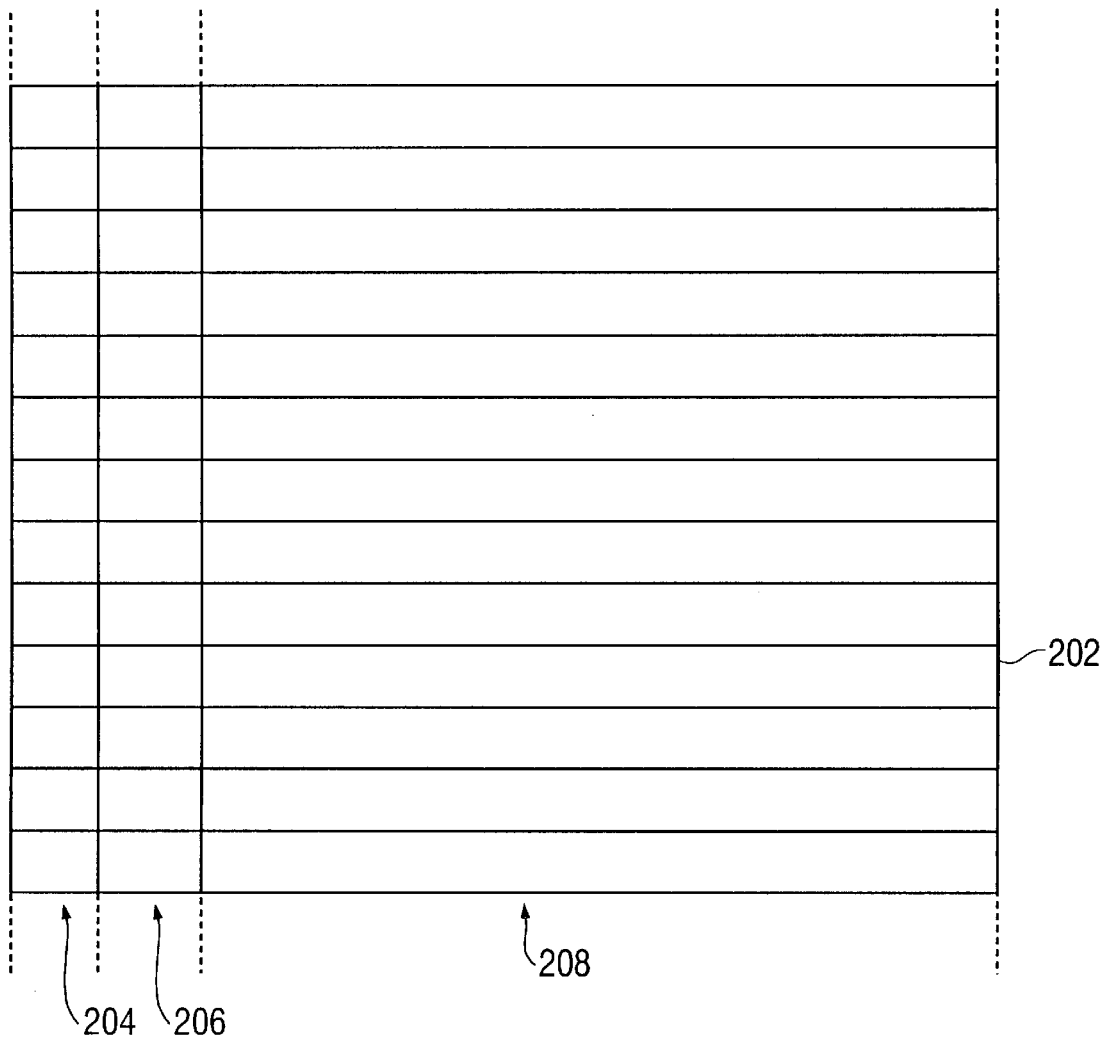
FIGS. 2–6 show an example of a buffer array and method of filling the buffer array according to the invention.

FIG. 2 shows buffer array 202 configured to operate in accordance with one embodiment according to the invention. Buffer array 202 contains columns 204, 206 and 208. Buffer array 202 stores incoming frames, such as incoming ethernet frames, in a manner corresponding to a method according to the invention. For example, presume frames A, B, and C are incoming frames and are each configured according to FIG. 1, such that each has a header 103, a data portion 105 and a CRC trailer 107. According to the invention, buffer array 202 acts as a circular buffer by storing the incoming headers 103 in column 206, storing the incoming data portions 105 in column 208 and storing the incoming CRC trailers 107 in column 204.

Figure 3:
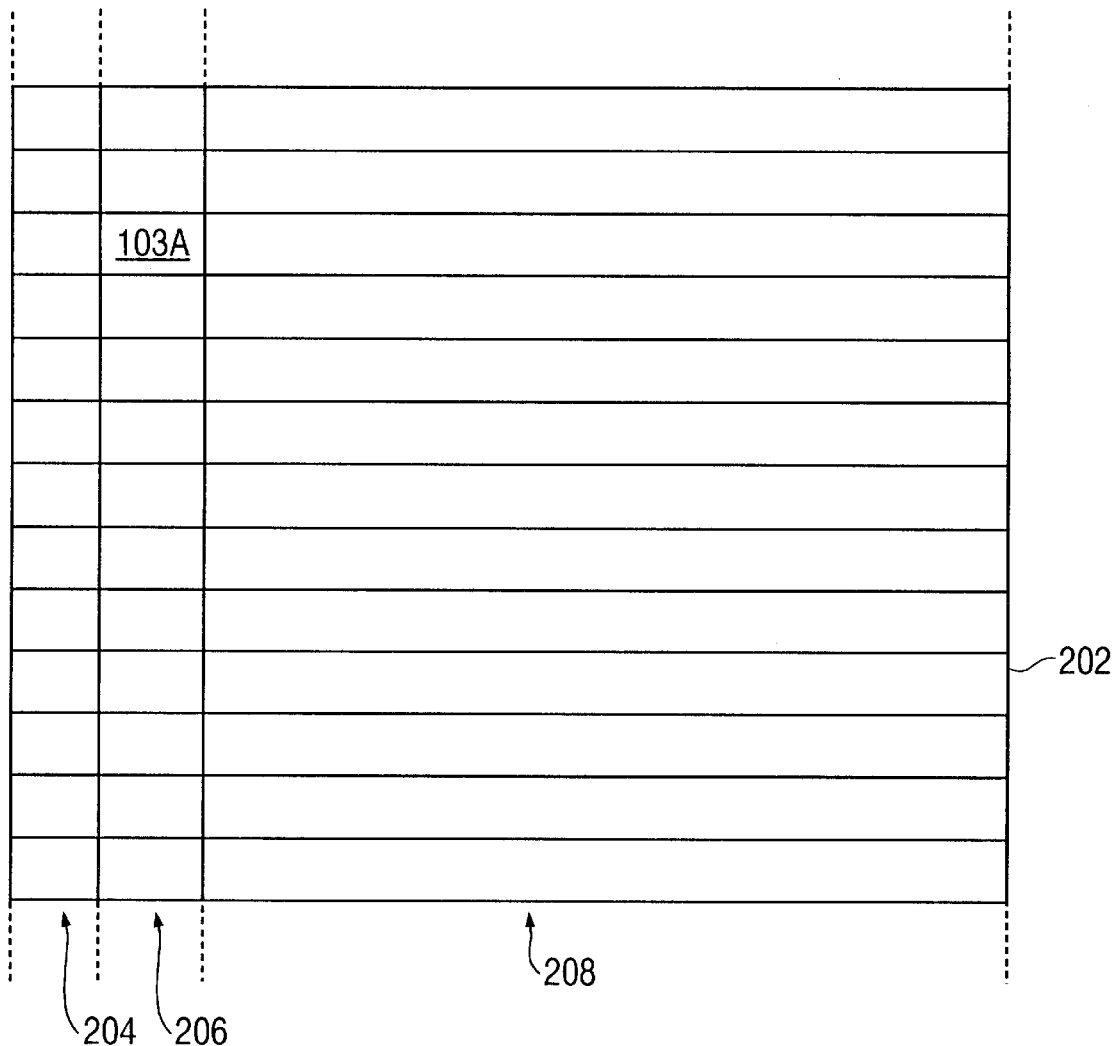
Figure 4:
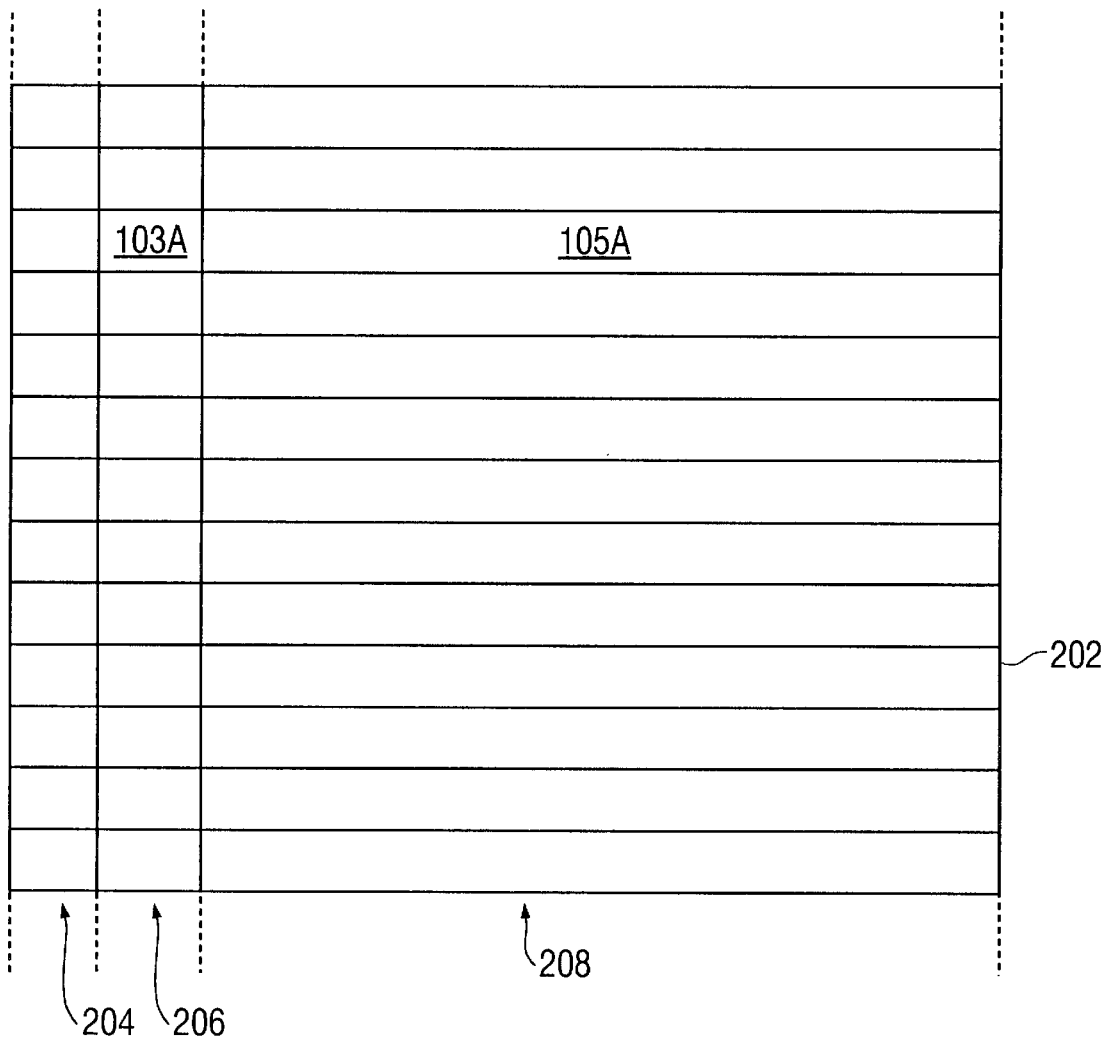
Figure 5:
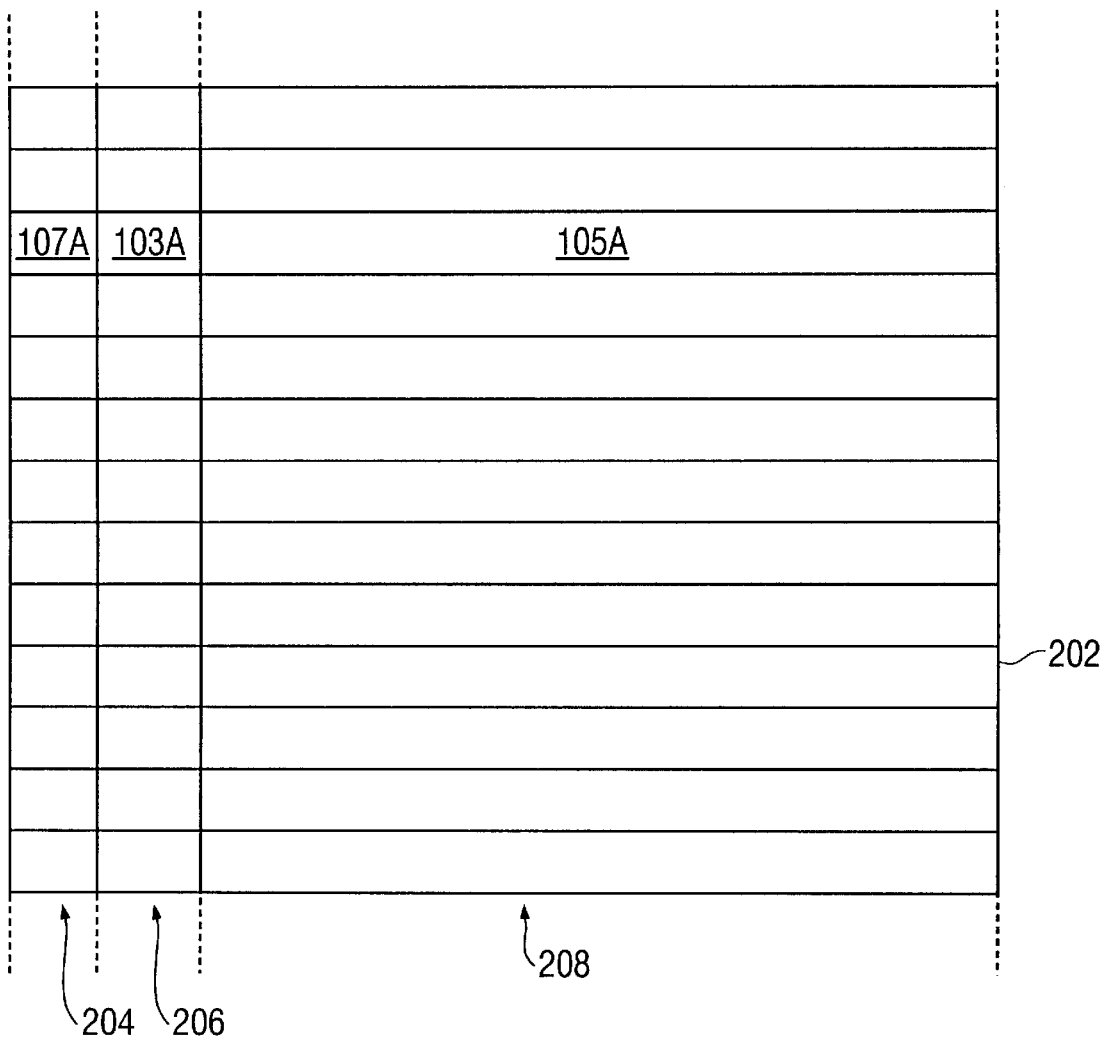
Figure 6:
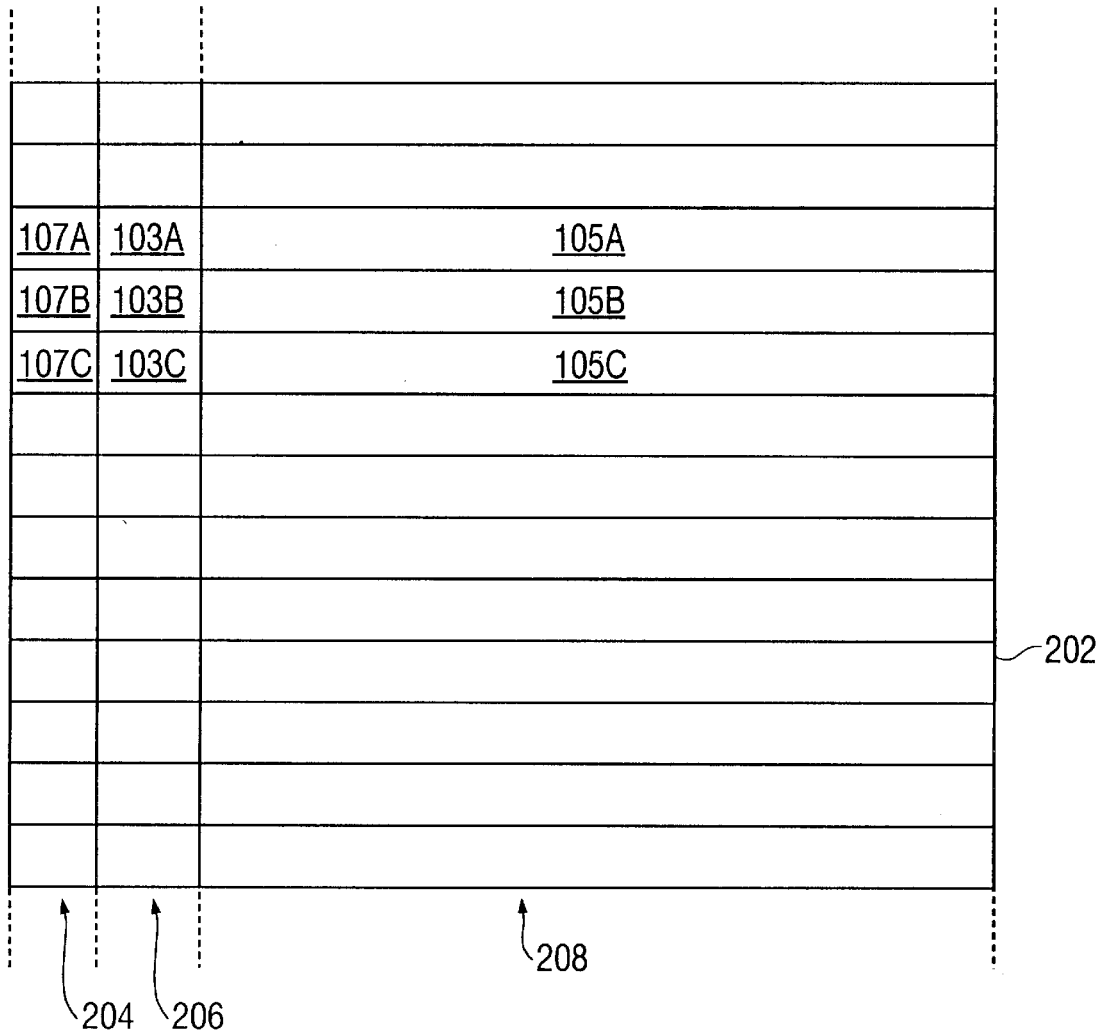

According to this method, FIG. 3 shows header 103A of frame A stored in column 206. Next, as shown in FIG. 4, data portion 105A of frame A is stored in column 208 in the same row as corresponding header 103A. Subsequently, as shown in FIG. 5, CRC 107A of frame A is stored in column 204 next to corresponding header 103A. As this process is repeated, frames B and C are additionally stored in buffer array 202 as shown in FIG. 6.

When buffer array 202 is employed in this manner, and the method of the present invention is followed, the processing of CRCs 107 which are based solely upon headers 103 is simplified since each CRC 107 is located proximate to its corresponding header 103.

Figure 7:
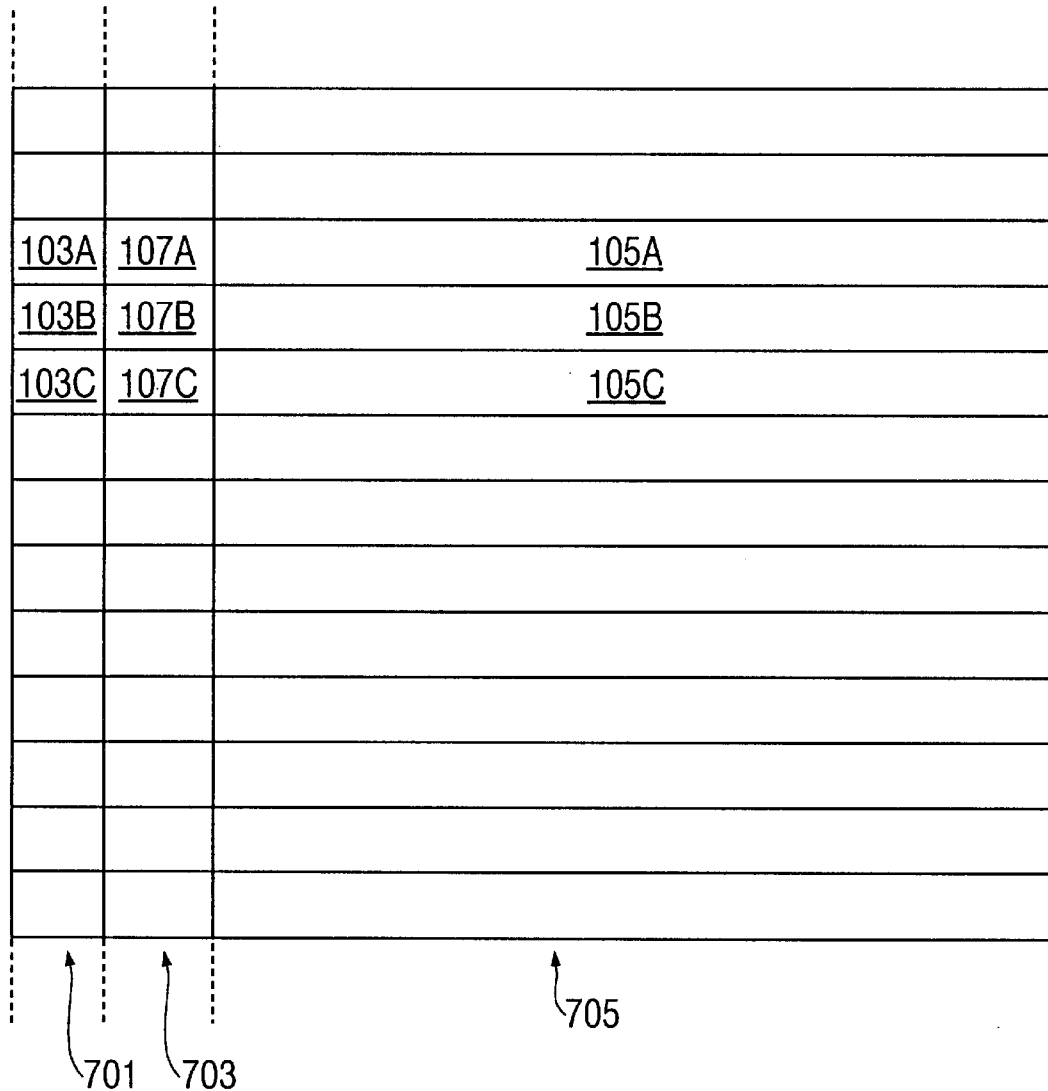
FIG. 7 shows another example of a buffer array and method of filling the buffer array according to the invention.

FIG. 7 shows an alternative configuration according to the invention wherein headers 103 are stored in column 701, CRCs 107 are stored in column 703 and data portions 105 are stored in column 705. This configuration differs slightly from that of FIGS. 2–6 in that as each incoming frame is processed by a frame segmentation unit, the header 103 of the frame will be stored in column 701, the data portion 105 will next be stored in column 705, and then the CRC of the frame will be stored in column 703. Similar to the embodiment of FIGS. 2–6, the header 103 will be stored next to the corresponding CRC 107 in order to simplify subsequent processing.

FIG. 8 shows a block diagram of a virtual circular buffer according to the invention which includes frame segmentation unit 801, buffer array 803, and, in one specific example, CRC evaluation unit 805. Incoming frames are received by frame segmentation unit 801 over bus 807. These frames are segmented into a header portion 103, a data portion 105 and a CRC portion 107. The portions of the frames are then provided to the buffer array 803. For example, in the configuration described in FIGS. 2–6, the header portions 103 are provided over line 809, the data portions 105 are provided over line 811, and the CRC portions are provided over line 813. These portions are thus stored in buffer array 103 so that CRC evaluation unit 805 can sequentially evaluate the individual CRCs based upon the proximate header portions 103. CRC evaluation unit 805 is shown connected to buffer array 803 via connection 815 which can cycle through the locations within buffer array 803 corresponding to the headers and CRCs in order to evaluate the CRCs based upon the headers.

Thus, the present invention provides a virtual circular buffer apparatus and a method of storing incoming frames, such as ethernet frames, wherein the CRC from the ethernet frame is stored proximate to a corresponding header to enable simplified evaluation of CRCs based upon the corresponding headers.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of processing incoming ethernet frames, comprising the steps of:

storing a header of each incoming ethernet frame in a header column of a buffer array;

storing a data field of each incoming ethernet frame in a data column of the buffer array, each data field being stored in a same row of the buffer array as a corresponding header; and storing a CRC of each incoming ethernet frame in a CRC column which is next to the header column, each CRC being stored in a same row of the buffer array as a corresponding header and a corresponding data field.

2. A method as recited in claim 1, further comprising the step of evaluating each stored CRC based on the header stored next to the CRC.

3. A method as recited in claim 1, wherein the header column is between the CRC column and the data column.

4. A method as recited in claim 2, wherein the CRC column is between the header column and the data column.

5. A method of processing incoming frames having a header followed by a data field which is followed by a CRC, comprising the steps of:

storing the header of each incoming frame in a header column of a buffer array;

storing a data field of each incoming frame in a data column of the buffer array, each data field being stored in a same row of the buffer array as a corresponding header; and storing a CRC of each incoming frame in a CRC column which is next to the header column, each CRC being stored in a same row of the buffer array as a corresponding header and a corresponding data field.

6. A method as recited in claim 5 further comprising the step of evaluating each stored CRC based on the header stored next to the CRC.

7. A method as recited in claim 5, wherein the header column is between the CRC column and the data column.

8. A method as recited in claim 5, wherein the CRC column is between the header column and the data column.

9. A virtual circular buffer, comprising:

an input frame segmentation unit;

a header column connected to the frame segmentation unit;

a data field column next to the header column, the data field column being connected to the frame segmentation unit; and a CRC column next to the header column, the CRC column being connected to the frame segmentation unit, wherein the frame segmentation unit receives incoming frames and stores a header of each incoming frame into the header column, a data field of each incoming frame into the data field column next to a corresponding header, and a CRC of each incoming frame into the CRC column next to the corresponding header.

10. A virtual circular buffer as recited in claim 9, further comprising a CRC evaluation unit connected to the header column and the CRC column, the CRC evaluation unit evaluating each CRC according to the corresponding header.

11. A virtual circular buffer as recited in claim 9, wherein the header column is between the CRC column and the data field column.

12. A virtual circular buffer as recited in claim 9, wherein the CRC column is between the header column and the data field column.

* * * * *